(12) United States Patent
Yeh et al.

(10) Patent No.: US 10,416,805 B2
(45) Date of Patent: Sep. 17, 2019

(54) TOUCH DISPLAY APPARATUS

(71) Applicant: HannStar Display Corporation, Taipei (TW)

(72) Inventors: Cheng-Yen Yeh, Taichung (TW);
Yu-Chen Liu, Taichung (TW);
Hsing-Ying Lee, Tainan (TW);
Yu-Cheng Lin, Pingtung County (TW)

(73) Assignee: HannStar Display Corporation, Taipei (TW)

( * ) Notice: Subject to any disclaimer, the term of this patent is extended or adjusted under 35 U.S.C. 154(b) by 172 days.

(21) Appl. No.: 15/293,304

(22) Filed: Oct. 14, 2016

(65) Prior Publication Data
US 2018/0004341 A1     Jan. 4, 2018

(30) Foreign Application Priority Data

Jul. 1, 2016 (CN) .......................... 2016 1 0516812

(51) Int. Cl.
*G06F 3/041* (2006.01)
*G02F 1/1333* (2006.01)
(Continued)

(52) U.S. Cl.
CPC ........ *G06F 3/0416* (2013.01); *G02F 1/13338* (2013.01); *G02F 1/134309* (2013.01);
(Continued)

(58) Field of Classification Search
CPC ............... G06F 3/0416; G02F 1/13338; G02F 1/134309
(Continued)

(56) References Cited

U.S. PATENT DOCUMENTS

| 2010/0182273 | A1* | 7/2010 | Noguchi | ............. | G02F 1/13338 |
| | | | | | 345/174 |
| 2013/0050130 | A1* | 2/2013 | Brown | .................... | G06F 3/044 |
| | | | | | 345/174 |

(Continued)

*Primary Examiner* — Lucy P Chien
(74) *Attorney, Agent, or Firm* — JCIPRNET

(57) ABSTRACT

A touch display apparatus including a display panel and multiple touch electrodes disposed on the display panel is provided. The display panel has a plurality of pixel regions. Each of the pixel regions is arranged with a first pixel pitch $P_{px}$ along a first direction. Each of the pixel regions is arranged with a second pixel pitch $P_{py}$ along a second direction. Each touch electrode has a plurality of touch patterns. Each of the touch patterns is arranged with a first touch pitch $P_{tx}$ along the first direction. Each of the touch patterns includes a plurality of bent segments connected to each other. Each of the bent segments is arranged with a second touch pitch $P_{ty}$ along the second direction. The first pixel pitch $P_{px}$, the second pixel pitch $P_{py}$, the first touch pitch $P_{tx}$ and the second touch pitch $P_{ty}$ satisfy at least one of the following equations (1) and (2):

$$30\% \leq \frac{|P_{tx} - P_{px}|}{P_{px}} \leq 50\%, \qquad \text{equation (1)}$$

$$3 \leq \frac{P_{ty}}{P_{py}} \leq 12. \qquad \text{equation (2)}$$

22 Claims, 7 Drawing Sheets

(51) Int. Cl.
*G02F 1/1343* (2006.01)
*G06F 3/044* (2006.01)

(52) U.S. Cl.
CPC ............ *G06F 3/044* (2013.01); *G06F 3/0412* (2013.01); *G02F 2001/134318* (2013.01); *G06F 2203/04107* (2013.01)

(58) Field of Classification Search
USPC .......................................................... 349/12
See application file for complete search history.

(56) References Cited

U.S. PATENT DOCUMENTS

2014/0360856 A1* 12/2014 Mizumoto .............. G06F 3/044
  200/600
2015/0331526 A1* 11/2015 Hashida .................. G06F 3/044
  345/174

* cited by examiner

TOUCH DISPLAY APPARATUS

CROSS-REFERENCE TO RELATED APPLICATION

This application claims the priority benefit of China application serial no. 201610516812.0, filed on Jul. 1, 2016. The entirety of the above-mentioned patent application is hereby incorporated by reference herein and made a part of the specification.

BACKGROUND OF THE INVENTION

Field of the Invention

The invention relates to a touch apparatus, and particularly relates to a touch display apparatus.

Description of Related Art

Touch display apparatuses are generally divided into resistive, capacitive, optical, acoustic and electromagnetic touch display apparatuses according to different touch sensing methods. Since the capacitive touch display apparatus has advantages of fast response speed, high reliability, high durability, etc., it has been widely used in various electronic products. According to different structures and manufacturing methods, the capacitive touch display apparatuses are roughly divided into an added-on type and an on-cell/in-cell type capacitive touch display apparatuses. However, regardless of the added-on type, the on-cell or the in-cell type, a plurality of touch electrodes of the capacitive touch display apparatus is overlapped with a plurality of pixel regions of a display panel. Since the touch electrodes and the display panel all have periodically arranged components and are overlapped to each other, the touch display apparatus is easy to produce a moiré pattern, which is of no avail for a visual effect of the touch display apparatus.

SUMMARY OF THE INVENTION

The invention is directed to a touch display apparatus, which has a good visual effect.

The invention provides a touch display apparatus including a display panel and a plurality of touch electrodes disposed on the display panel. The display panel has a plurality of pixel regions. Each of the pixel regions is arranged with a first pixel pitch $P_{px}$ along a first direction. Each of the pixel regions is arranged with a second pixel pitch $P_{py}$ along a second direction. Each of the touch electrodes has a plurality of touch patterns. Each of the touch patterns of the touch electrodes is arranged with a first touch pitch $P_{tx}$ along the first direction. Each of the touch patterns includes a plurality of bent segments connected to each other. Each of the bent segments is arranged with a second touch pitch $P_{ty}$ along the second direction. The first pixel pitch $P_{px}$, the second pixel pitch $P_{py}$, the first touch pitch $P_{tx}$ and the second touch pitch $P_{ty}$ satisfy at least one of the following equations (1) and (2):

$$30\% \leq \frac{|P_{tx} - P_{px}|}{P_{px}} \leq 50\%, \quad \text{equation (1)}$$

$$3 \leq \frac{P_{ty}}{P_{py}} \leq 12 \quad \text{equation (2)}$$

In an embodiment of the invention, the display panel includes two substrates opposite to each other and a display medium disposed between the two substrates. Each of the substrates has an outer surface facing away from the display medium. The touch electrodes are directly disposed on an outer surface of one of the substrates.

In an embodiment of the invention, the touch display apparatus further includes a protection substrate. The protection substrate is disposed on the display panel and has an inner surface facing the display panel. The touch electrodes are disposed on the inner surface of the protection substrate.

In an embodiment of the invention, each of the touch patterns presents a sawtooth shape.

In an embodiment of the invention, each of the bent segments of each of the touch patterns includes a first straight segment and a second straight segment. The first straight segment and the second straight segment extend toward different directions and are connected to each other, where a length of the first straight segment and a length of the second straight segment are different.

In an embodiment of the invention, each of the bent segments of each of the touch patterns includes a first straight segment and a second straight segment. The first straight segment and the second straight segment extend toward different directions and are connected to each other, where a length of the first straight segment and a length of the second straight segment are the same.

In an embodiment of the invention, each of the bent segments of each of the touch patterns includes a first straight segment and a second straight segment. The first straight segment and the second straight segment extend toward different directions and are connected to each other. An included angle between the first straight segment and the second direction ranges between 0 degree and 52 degrees.

In an embodiment of the invention, each of the bent segments of each of the touch patterns includes a first straight segment, a second straight segment, a third straight segment and a fourth straight segment. The first straight segment, the second straight segment, the third straight segment and the fourth straight segment are sequentially arranged along the second direction and are connected to each other. The first straight segment and the second straight segment extend toward different directions. A length of the first straight segment is smaller than a length of the second straight segment. The third straight segment and the fourth straight segment extend toward different directions. A length of the third straight segment is greater than a length of the fourth straight segment.

In an embodiment of the invention, the touch electrodes include a first touch electrode and a second touch electrode electrically independent to each other and located adjacent to each other. A first touch internal space exists between two adjacent touch patterns of the first touch electrode. A second touch internal space exists between two adjacent touch patterns of the second touch electrode. A width of the first touch internal space in the first direction is equal to a width of the second touch internal space in the first direction.

In an embodiment of the invention, a touch external space exists between the first touch electrode and the second touch electrode. A width of the touch external space in the first direction, the width of the first touch internal space in the first direction and the width of the second touch internal space in the first direction are the same.

In an embodiment of the invention, the touch display apparatus further includes a plurality of peripheral lines. The peripheral lines are respectively and electrically connected to the touch electrodes. A portion of each of the peripheral lines and a plurality of the touch patterns of the touch electrodes are arrange along the first direction. A shape of the portion of each of the peripheral lines is consistent with a shape of the touch pattern. Each of the peripheral lines is arranged with a line pitch along the first direction, and the line pitch is equal to the first touch pitch.

In an embodiment of the invention, a touch internal space exits between any two adjacent touch patterns of each of the touch electrodes. A line space exists between any two adjacent peripheral lines. A width of the touch internal space in the first direction is equal to a width of the line space in the first direction.

In an embodiment of the invention, the touch display apparatus further includes a common electrode. The common electrode has a plurality of common patterns. The common patterns and the touch patterns of the touch electrodes are arranged along the first direction. A shape of a portion of each of the common patterns is consistent with a shape of a portion of each of the touch patterns. Each of the common patterns is arranged with a common pitch along the first direction. The common pitch is equal to the first touch pitch.

In an embodiment of the invention, a touch internal space exists between any two adjacent touch patterns of each of the touch electrodes. A common internal space exists between any two adjacent common patterns. A width of the touch internal space in the first direction is equal to a width of the common internal space in the first direction.

In an embodiment of the invention, the touch display apparatus further includes a plurality of peripheral lines and at least a common electrode. The peripheral lines are respectively and electrically connected to the touch electrodes. The common electrode is disposed outside the touch electrodes or interposed among the touch electrodes. The common electrode has a plurality of common patterns. The common patterns and the touch patterns of the touch electrodes are arranged along the first direction. A touch internal space exists between any two adjacent touch patterns of each of the touch electrodes. A common external space exists between the common electrode and one adjacent peripheral line. A width of the touch internal space in the first direction is equal to a width of the common external space in the first direction.

In an embodiment of the invention, a touch internal space exists between two adjacent touch patterns of each of the touch electrodes. A width of the touch internal space in the first direction is greater than or equal to 5 µm, and a light transmittance of each of the touch patterns is smaller than or equal to 92%.

In an embodiment of the invention, the touch electrodes are formed in a same thin film layer.

In an embodiment of the invention, a touch sensing method of the touch display apparatus is capacitive sensing.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
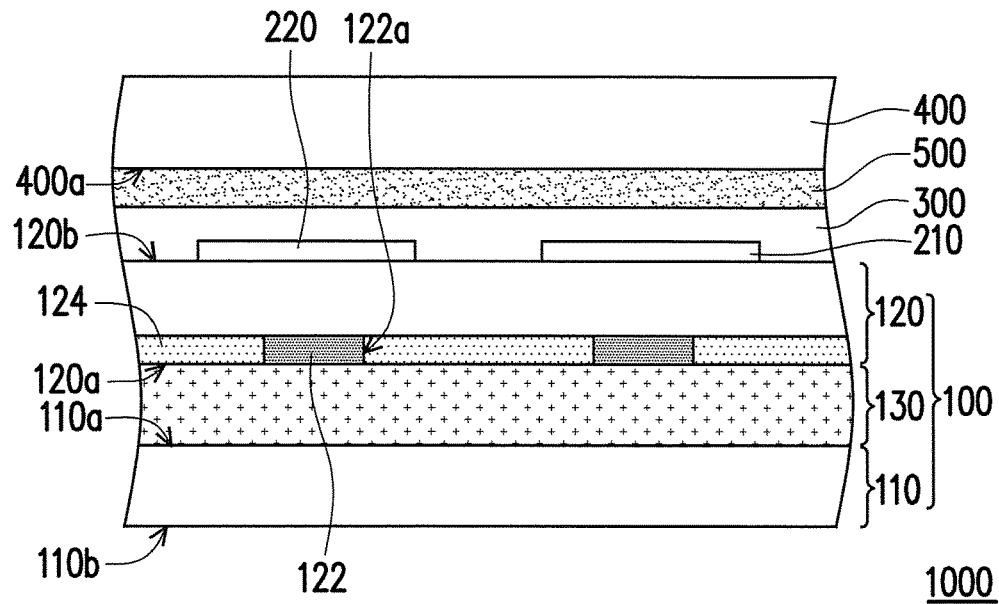
FIG. 1 is a schematic cross-sectional view of a touch display apparatus according to an embodiment of the invention.

FIG. 1 is a schematic cross-sectional view of a touch display apparatus according to an embodiment of the invention. Referring to FIG. 1, the touch display apparatus 1000 includes a display panel 100 and a plurality of touch electrodes 210, 220 disposed on the display panel 100. The display panel 100 includes two substrates 110, 120 opposite to each other and a display medium 130 located between the substrate 110 and the substrate 120. In the present embodiment, the display medium 130 is, for example, liquid crystal. However, the invention is not limited thereto. In other embodiments, the display medium 130 can also be other proper materials, for example, an organic light-emitting diode (OLED), etc.

In the present embodiment, the substrate 110 is, for example, a pixel array substrate. The pixel array substrate includes a plurality of active devices (not shown) and a plurality of pixel electrodes (not shown) electrically connected to the active devices. The substrate 120 is, for example, a color filter substrate of a LCD display panel or an encapsulation substrate of an OLED display panel. The color filter substrate includes a light-shielding pattern 122. The light-shielding pattern 122 has a plurality of light-transmitting regions 122a. The light-transmitting regions 122a are respectively overlapped to the pixel electrodes. In the present embodiment, the light-shielding pattern 122 is, for example, a black matrix. The substrate 120 may selectively include a plurality of color filter patterns 124. The color filter patterns 124 are respectively disposed at the light-transmitting regions 122a of the light-shielding pattern 122. It should be noted that the light-shielding pattern 122 is not limited to be the black matrix, and in other embodiments, configuration of the black matrix can be omitted. In detail, in another embodiment, the adjacent color filter patterns or organic emitting layers can be partially stacked, and the mutually stacked portions of the color filter patterns or organic emitting layers may serve as the light-shielding pattern 122 to replace the function of the black matrix. Moreover, positions of the color filter patterns 124 and whether the color filter patterns 124 are configured are not limited by the invention. For example, in another embodiment, the color filter patterns 124 can be integrated in the pixel array substrate (i.e. the substrate 110) to form a color filter on array (COA) structure. In another embodiment, when the display medium 130 includes organic light-emitting diode (OLED), the light-shielding pattern 122 can selectively be deposed on the substrate 110 or the substrate 120. In another embodiment, if the touch display apparatus 1000 is not required to display a color image or the display medium 130 (for example, organic light-emitting diodes) itself is capable of emitting a color light, the color filter patterns 124 can be selectively omitted.

The substrate 110 and the substrate 120 respectively have an inner surface 110a and an inner surface 120a facing the display medium 130, and an outer surface 110b and an outer surface 120b facing away from the display medium 130. In the present embodiment, the touch electrode 210 and the touch electrode 220 can be directly or indirectly disposed on the outer surface 120b of the substrate 120 of the display panel 100 to form an on cell touch structure. The substrate 120 on which the touch electrodes 210, 220 deposed can also be regarded as a touch substrate 120. A polarizer 300 can be disposed on the touch electrode 210 and the touch electrode 220. A protection substrate 400, such as a strengthened glass or a plastic substrate can be disposed on the polarizer 300 through an optical adhesive 500. However, the invention is not limited thereto, and in other embodiment, the touch electrode 210 and the touch electrode 220 can also be disposed at other suitable positions such as being disposed on the inner surface 120a of the substrate 120.

Figure 2:
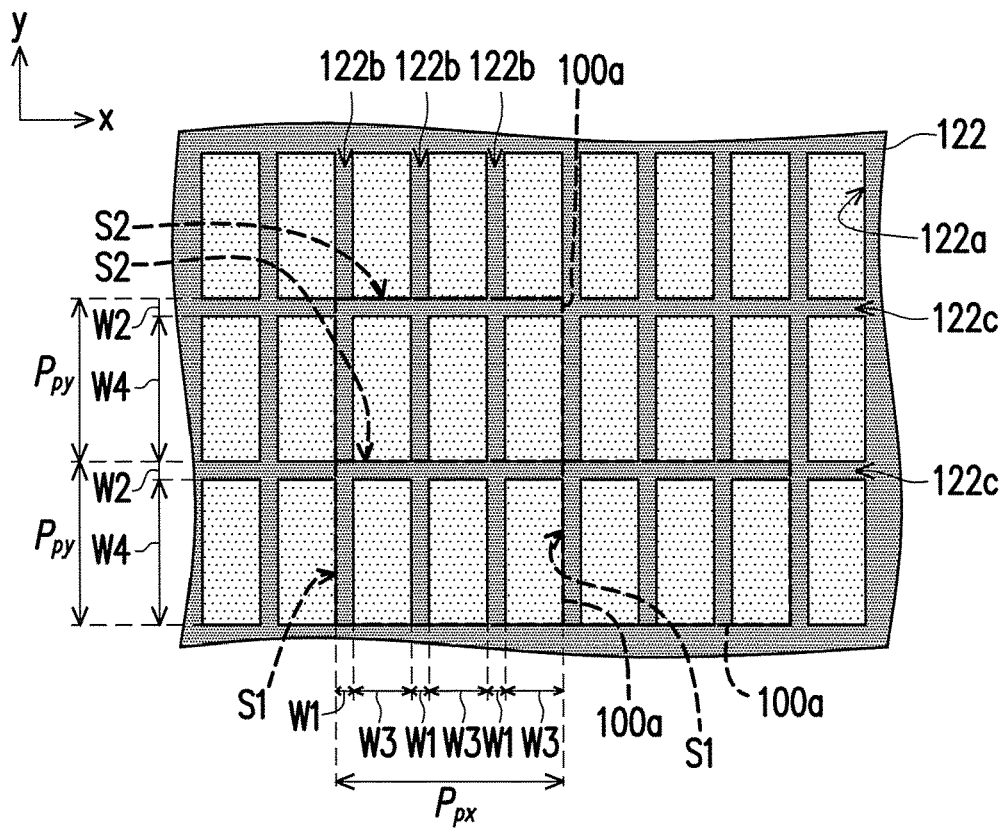
FIG. 2 is a partial enlarged top view of a display panel according to an embodiment of the invention.

FIG. 2 is a partial enlarged top view of a display panel according to an embodiment of the invention. Referring to FIG. 2, the display panel 100 has a plurality of pixel regions 100a arranged in an array type and the pixel regions 100a are collectively defined as an active area through which a backlight can transmit. In other words, the pixel regions 100a are defined on the pixel array substrate 110 or on the touch substrate 120 depending on where the light-shielding pattern 122, such as black matrix (BM), is located. For example, when the light-shielding pattern 122 is located on the substrate 120, the display panel 100 can be an on cell touch LCD display panel and the substrate 120 is a color filter substrate with touch function. Another example is that when the light-shielding pattern 122 is located on the substrate 110, the display panel 100 can be a AMOLED display panel and the substrate 120 is a encapsulation substrate with touch function. In the present embodiment, each of the pixel regions 100a may include a plurality of sub-pixel regions respectively corresponding to different colors. For example, each of the pixel regions 100a may include three sub-pixel regions respectively corresponding to red, green and blue colors. However, the invention is not limited thereto, the number of the sub-pixel regions of each of the pixel regions 100a and the colors corresponding to the sub-pixel regions can be determined according to an actual requirement, for example, four sub-pixels of the white color, the red color, the green color and the blue color, or four sub-pixels of the yellow color, the red color, the green color and the blue color. The pixel regions 100a are arranged with first pixel pitches $P_{px}$ as repeated intervals along a first direction x. The pixel regions 100a are arranged with second pixel pitches $P_{py}$ as repeated intervals along a second direction y. The first direction x intersect the second direction y. In the present embodiment, the first direction x can be perpendicular to the second direction y, though the invention is not limited thereto. In other words, each of the pixel regions 100a in the active area has a length of a first pixel pitch $P_{px}$ along a first direction and has a length of a second pixel pitch $P_{py}$ along a second direction. From an alternative viewpoint, a first pixel pitch $P_{px}$ along a first direction can also be regards as a length form a central point of a pixel region 100a to the other central point of an adjacent pixel region 100a along the first direction, and a second pixel pitch $P_{py}$ along a second direction can be regards as a length form a central point of a pixel region 100a to the other central point of an adjacent pixel region 100a along the second direction (not shown in FIG. 2).

The light-shielding pattern 122 includes a plurality of first light-shielding portions 122b and a plurality of second light-shielding portions 122c. The first light-shielding portions 122b and the second light-shielding portions 122c are intersected to define a plurality of light-transmitting regions 122a. Each of the pixel regions includes a plurality of light-transmitting regions 122a. In the present embodiment, for example, each of the pixel regions may include three light-transmitting regions 122a. The first pixel pitch $P_{px}$ is between a first side S1 of a pixel region 100a to a first side S1 of an adjacent pixel region 100a along the first direction x. In the present embodiment, a first side S1 of each of pixel regions 100a may refer to an edge of a first light-shielding portions 122b defining a light-transmitting regions 122a located at the leftmost position within the pixel region 100a. The second pixel pitch $P_{py}$ is between a second side S2 of a pixel region 100a to a second side S2 of an adjacent pixel region 100a along the second direction y. In the present embodiment, a second side S2 of each of pixel regions 100a may refer to an edge of a second light-shielding portion 122c defining the pixel region 100a.

Each of the first light-shielding portions 122b has a width W1 in the first direction x. Each of the second light-shielding portions 122c has a width W2 in the second direction y. Each of the light-transmitting regions 122a has a width W3 in the first direction x, and each of the light-transmitting regions 122a has a width W4 in the second direction y. In the present embodiment, the first pixel pitch $P_{px}$ may refer to a sum of three widths W1 of three first light-shielding portions 122b and three widths W3 of three light-transmitting regions 122a. That is, $P_{px}=3W1+3W3$. The second pixel pitch $P_{py}$ may refer to a sum of the width W2 of one second light-shielding portion 122c and the width W4 of one light-transmitting region 122a. That is, $P_{py}=W2+W4$. However, the invention is not limited thereto, and in other embodiment, the first pixel pitch $P_{px}$ and the second pixel pitch $P_{py}$ can be defined by a plurality of scan lines and a plurality of data lines corresponding to the first light-shielding portions 122b and the second light-shielding portions 122c or other components of the display panel 100.

Figure 3:
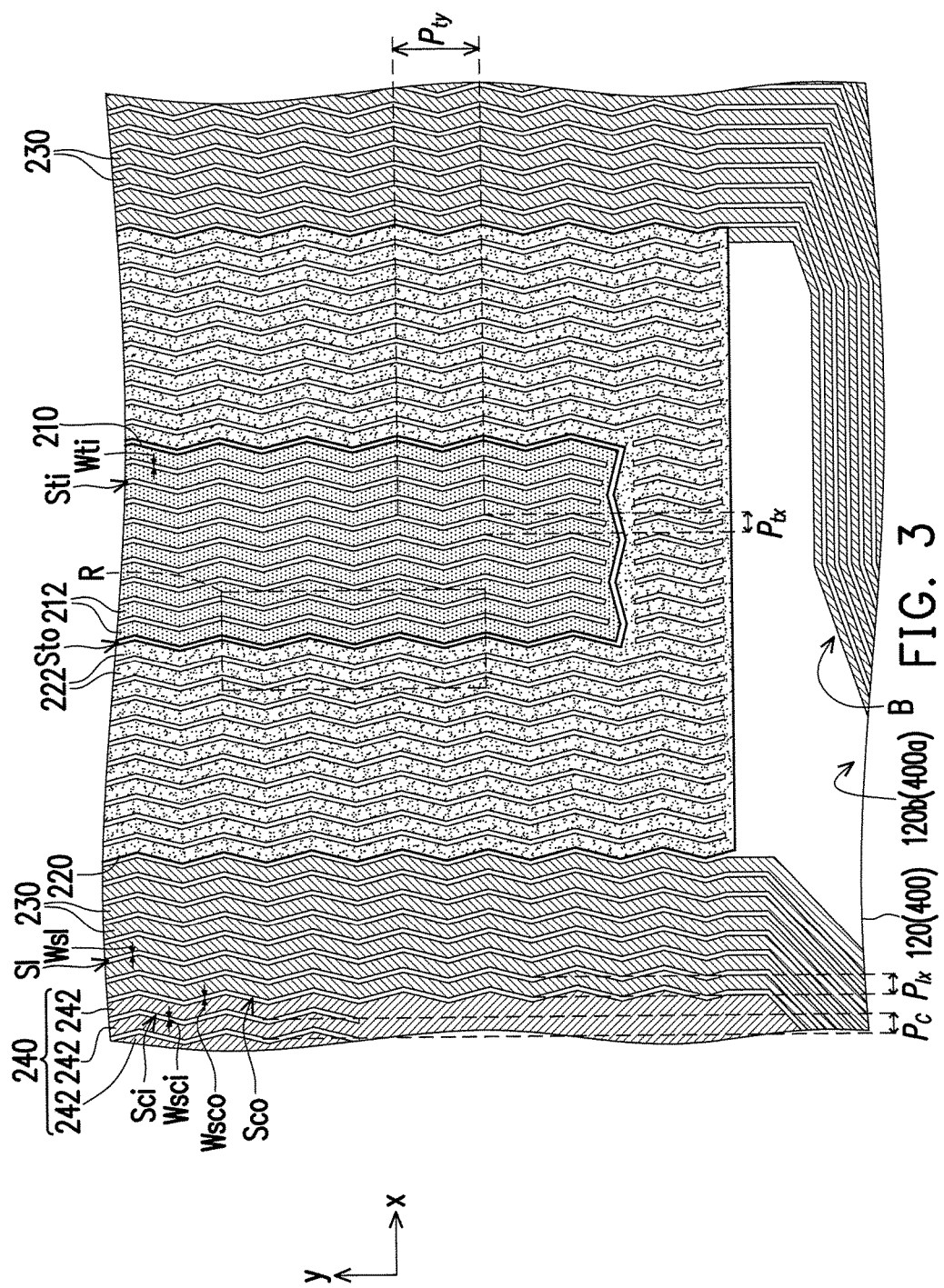
FIG. 3 is a partial enlarged top view of a touch electrode and peripheral lines according to an embodiment of the invention.
Figure 4:
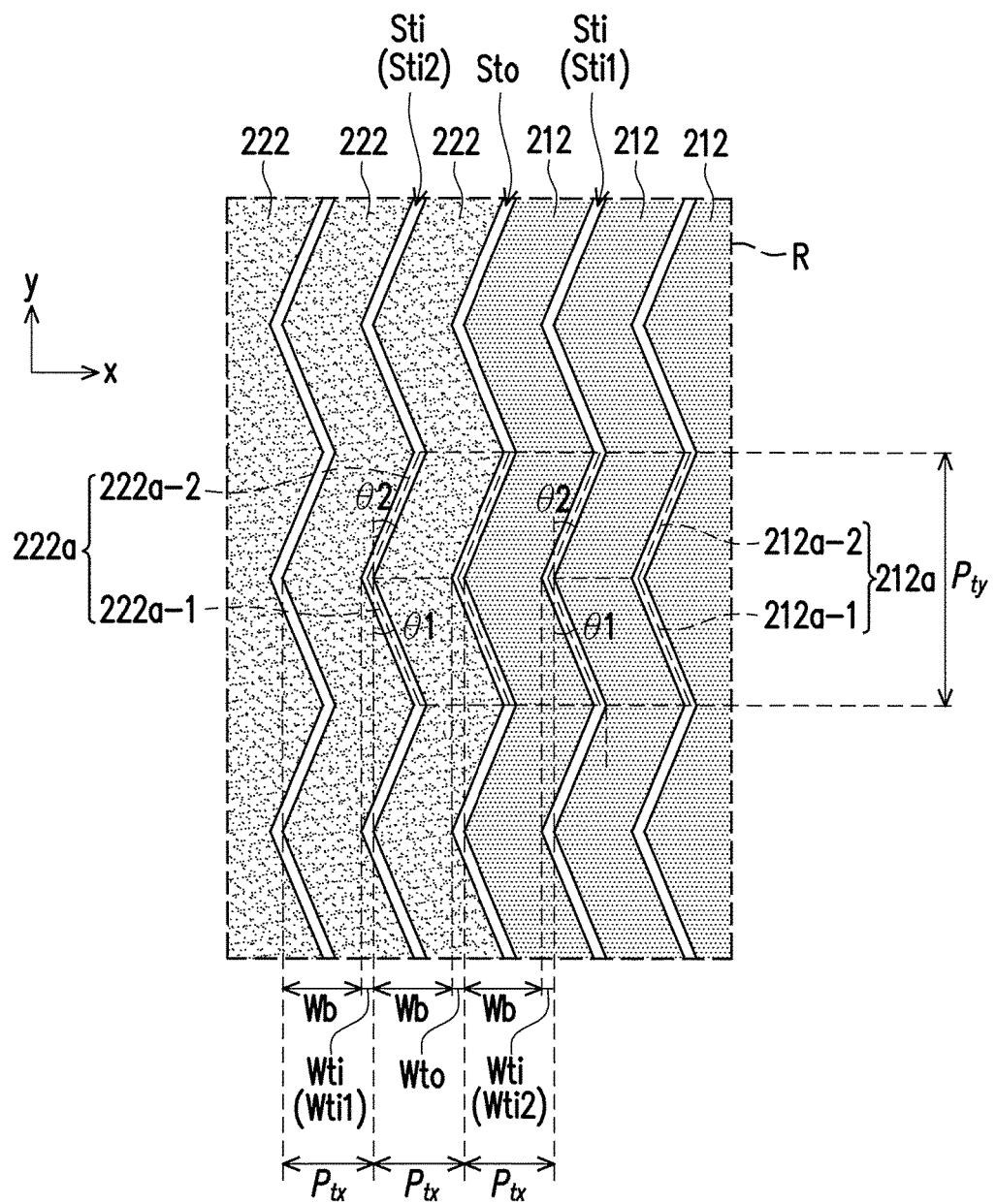
FIG. 4 is a partial enlarged view of a touch electrode according to an embodiment of the invention.

FIG. 3 is a partial enlarged top view of a touch electrode and peripheral lines according to an embodiment of the invention. The touch electrodes 210, 220 and peripheral lines 230 may be located at a position fully or partially overlapping the active area mentioned above from the top view direction that perpendicular to the outer surface 120b of the second substrate 120. FIG. 4 is a partial enlarged view of a touch electrode according to an embodiment of the invention. Particularly, FIG. 4 corresponds to a region R of FIG. 3. Referring to FIG. 3 and FIG. 4, each of the touch electrode 210 and the touch electrode 220 has a plurality of touch patterns 212 and touch patterns 222. Preferably, each of the touch patterns 212 and touch patterns 222 has multiple bent segments. Each bent segment has at least a turning point, such as two turning points opposite to each other. The touch patterns 212 and the touch patterns 222 of the touch electrodes 210, 220 are arranged with a first touch pitch $P_{tx}$ along the first direction x. As shown in FIG. 4, in the present embodiment, the first touch pitch $P_{tx}$ may refer to a distance between a turning point of the touch pattern 212 and a turning point of the touch pattern 212, a distance between a turning point of the touch pattern 212 and a turning point of the adjacent touch pattern 212, or a distance between a turning point of the touch pattern 222 and a turning point of the adjacent touch pattern 222 along the first direction x. Each of the touch patterns 212 or the touch patterns 222 has a width Wb in the first direction x. A touch internal space Sti exists between two adjacent touch patterns 212 or two adjacent touch patterns 222. The touch internal space Sti has a width Wti in the first direction x. The first touch pitch $P_{tx}$ may be a sum of the width Wb of one touch pattern 212/touch pattern 222 and the width of one touch internal space Sti. In other words, each of the touch patterns 212, 222 has a width Wb equal to a first touch pitch $P_{tx}$ deduct a width Wti of the touch internal space Sti ($P_{tx}$−Wti=Wb), and each of the touch patterns 212, 222 has multiple second touch pitches $P_{ty}$ along the second direction y.

In the present embodiment, the plurality of touch electrodes 210, 220 include at least a first touch electrode 210 and a second touch electrode 220 which are electrically independent to each other and located adjacent to each other. One of the first touch electrode 210 and the second touch electrode 220 is a transmitter electrode for carrying a driving signal. The other one of the first touch electrode 210 and the second touch electrode 220 is a receiver electrode for carrying an induced sensing signal. In other embodiment, the first touch electrode 210 can function as both a transmitter electrode and a receiver electrode. Likewise, the second touch electrode 220 can function as both a transmitter electrode and a receiver electrode. The first touch electrode 210 and the second touch electrode 220 can be the same thin film layer, though the invention is not limited thereto. A sensing method of the first touch electrode 210 and the second touch electrode 220 is, for example, a capacitive sensing method. The capacitive sensing method can be a self-capacitive sensing method or a mutual capacitive sensing method. Pattern designs of the first touch electrode(s) 210 and the second touch electrode(s) 220 can be a structure of single-transmitter electrode corresponding to multi-receiver electrodes, single-transmitter electrode corresponding to two-receiver electrodes (1T2R), single-transmitter electrode corresponding to three-receiver electrodes (1T3R) or vice versa (single-receiver electrode corresponding to multi-transmitter electrodes) or other proper structure. The single-transmitter electrode corresponding to two-receiver electrodes (1T2R) refers to that one first touch electrode 210 corresponds to two second touch electrodes 220 which are adjacent to the first touch electrode 210, and after a driving signal is provided to the first touch electrode 210, the corresponding two second touch electrodes 220 respectively output sensing signals to an integrated circuit to implement signal processing. Also, The single-transmitter electrode corresponding to two-receiver electrodes (1T2R) can refer to that one second touch electrode 220 corresponds to two first touch electrodes 210 which are adjacent to the second touch electrode 220. The single-transmitter electrode corresponding to three-receiver electrodes (1T3R) refers to that one first touch electrode 210 corresponds to three second touch electrodes 220 which are adjacent to the first touch electrode 210 or one second touch electrode 220 corresponds to three first touch electrodes 210 which are adjacent to the second touch electrode 220.

The first touch electrode 210 has a plurality of touch patterns 212. The second touch electrode 220 has a plurality of touch patterns 222. In the present embodiment, the width Wb of each of the touch patterns 212 in the first direction x is equal to the width Wb of each of the touch patterns 222 in the first direction x. A first touch internal space Sti1 exits between the two adjacent touch patterns 212 of the first touch electrode 210. A second touch internal space Sti2 exits between the two adjacent touch patterns 222 of the second touch electrode 220. A touch external space Sto exists between the first touch electrode 210 and the second touch electrode 220. A width of the touch external space Sto in the first direction x, a width Wti1 of the first touch internal space Sti1 in the first direction x and a width Wti2 of the second touch internal space Sti2 in the first direction x are substantially the same. For example, the width of the touch external space Sto, the width Wti1 of the first touch internal space Sti1 and the width Wti2 of the second touch internal space Sti2 can be greater than or equal to 5 μm, and a light transmittance of each of the touch patterns 212 and the touch patterns 222 can be smaller than or equal to 92%, though the invention is not limited thereto. The first touch electrode 210 and the second touch electrode 220 can be transparent electrodes. A material of the transparent electrodes includes nano metal wire (for example, nano silver wire) or metal oxide, for example, indium tin oxide, indium zinc oxide, aluminium tin oxide, aluminium zinc oxide, indium germanium zinc oxide, or other proper oxides, or a stacked layer of at least two of the above oxides.

Each of the first touch patterns 212 and the touch patterns 222 includes a plurality of bent segments 212a and bent segments 222a connected to each other. The bent segments 212a and the bent segments 222a are arranged with second touch pitches $P_{ty}$ as repeated intervals along the second direction y. A second touch pitch $P_{ty}$ is equal to the length of one bent segment 212a or one bent segment 222a in the second direction y. In order to alleviate moiré patterns caused by the ambient light, it's better to have the second touch pitch $P_{ty}$ in the range of 40 μm to 210 μm. In the present embodiment, each of the touch patterns 212 and the touch patterns 222 has a profile of sawtooth shape. In detail, each of the bent segments 212a may include at least a first straight segment 212a-1 and a first straight segment 222a-1, and each of the bent segments 222a may include at least a second straight segment 212a-2 and a second straight segment 222a-2. The first straight segment 212a-1 and a first straight segment 222a-1 connect to each other and extending towards different directions. The second straight segment 212a-2 and the second straight segment 222a-2 connect to each other and extending towards different directions. An included angle θ1 of the first straight segment 212a-1/222a-1 and the second direction y may range between 0 degree and 52 degrees. An included angle θ2 of the second straight segment 212a-2/222a-2 and the second direction y may also range between 0 degree and 52 degrees. In the present embodiment, the included angle θ1 can be equal to the included angle θ2, though the invention is not limited thereto, and in other embodiments, the included angle θ1 and the included angle θ2 can be different. In the present embodiment, the respective length of the first straight segment 212a-1, 222a-1, and the second straight segment 212a-2, 222a-2 is the same. However, the invention is not limited thereto, and in other embodiments, the length of the first straight segment 212a-1 or 222a-1 can be different to the length of the second straight segment 212a-2 or 222a-2. Moreover, the number of straight segments of each of the bent segments 212a or the bent segments 222a is not limited to two, which is described below with reference of FIG. 5, FIG. 6 and FIG. 7.

Figure 5:
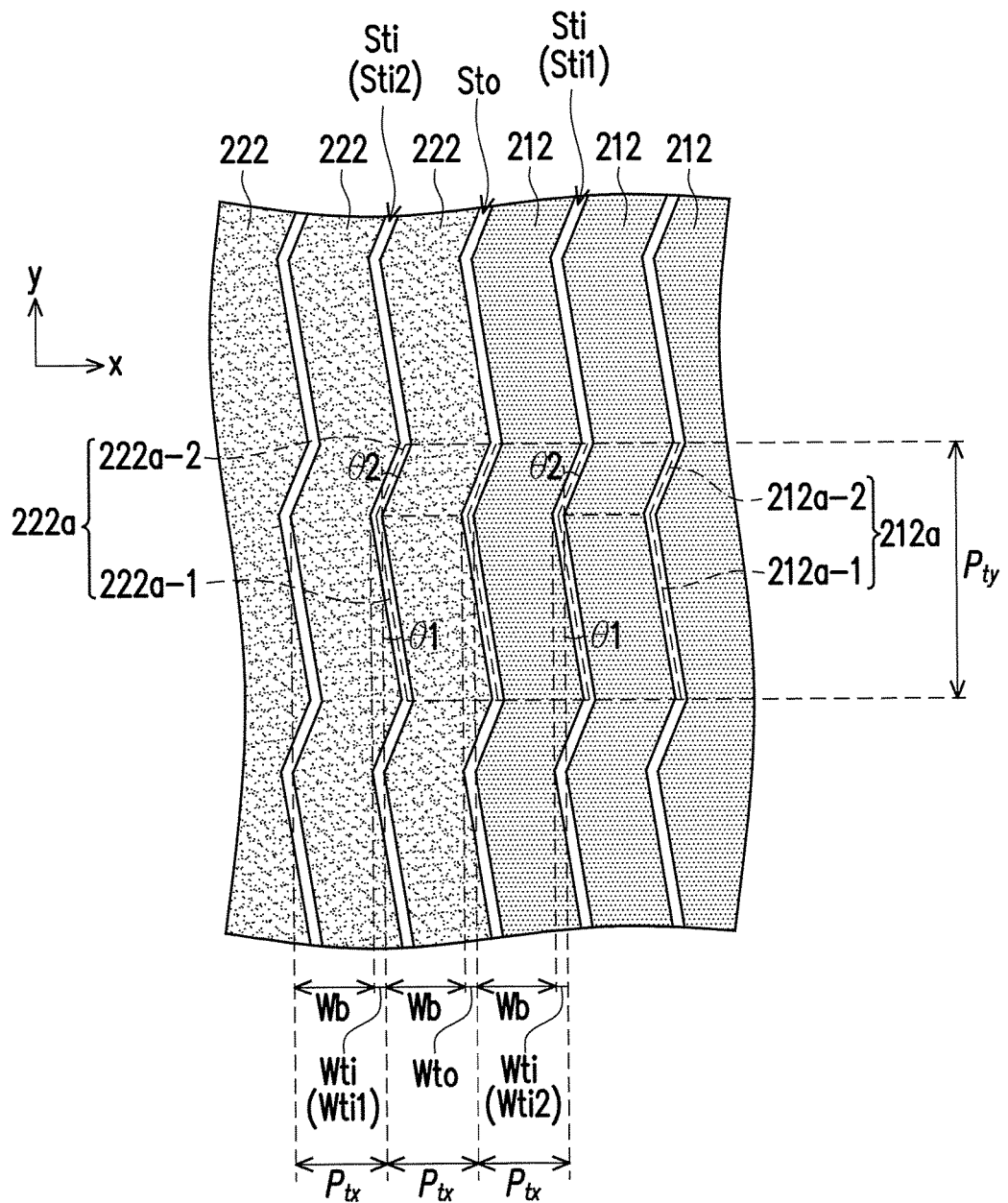
FIG. 5 is a partial enlarged schematic diagram of multiple touch patterns of two touch electrodes according to another embodiment of the invention.

FIG. 5 is a partial enlarged schematic diagram of multiple touch patterns of two touch electrodes according to another embodiment of the invention. Referring to FIG. 5, one bent segment 212a of the touch pattern 212 includes a first straight segment 212a-1 and a second straight segment 212a-2 connected to each other and extending towards different directions. One bent segment 222a of the touch pattern 222 includes a first straight segment 222a-1 and a second straight segment 222a-2 connected to each other and extending towards different directions. A length of the first straight segment 212a-1 is different to a length of the second straight segment 212a-2, and a length of the first straight segment 222a-1 is different to a length of the second straight segment 222a-2. The first straight segment 212a-1 or 222a-1 is closer to a line collection region B (shown in FIG. 3) compared to the second straight segment 212a-2 or 222a-2 in each of the same bent segment 212a or 222a. In the embodiment of FIG. 5, a length of the second straight segment 212a-2 is smaller than a length of the first straight segment 212a-1 in one first bent segment 212a. Likewise, a length of the second straight segment 222a-2 is smaller than a length of the first straight segment 222a-1 in one second bent segment 222a.

Figure 6:
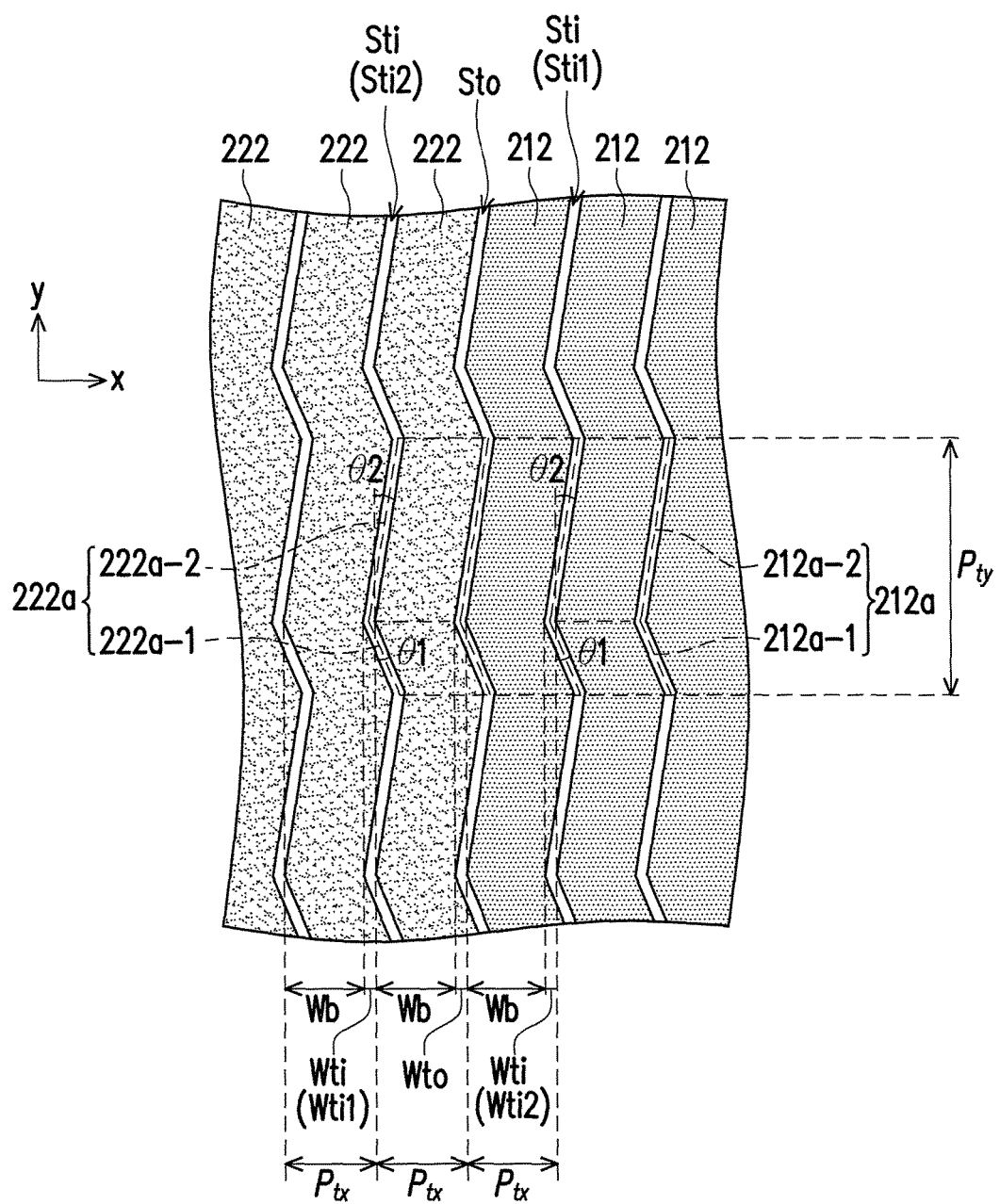
FIG. 6 is a partial enlarged schematic diagram of multiple touch patterns of two touch electrodes according to still another embodiment of the invention.

FIG. 6 is a partial enlarged schematic diagram of multiple touch patterns of two touch electrodes according to still another embodiment of the invention. Referring to FIG. 6, the different between FIG. 5 and FIG. 6 is that a length of the first straight segment 212a-1 is smaller than a length of the second straight segment 212a-2 in one first bent segment 212a, and a length of the first straight segment 222a-1 is smaller than a length of the second straight segment 222a-2 in one second bent segment 222a.

Figure 7:
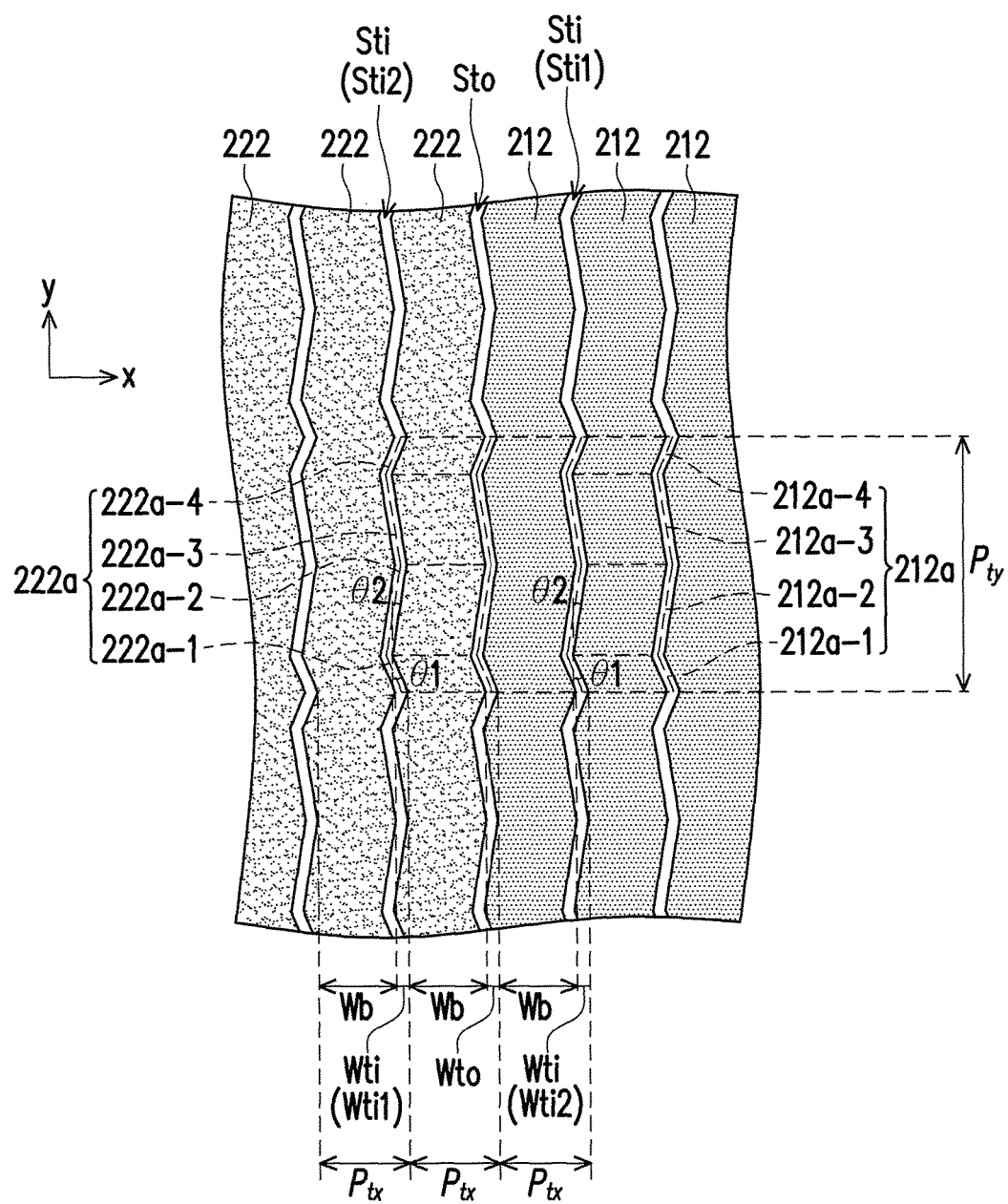
FIG. 7 is a partial enlarged schematic diagram of multiple touch patterns of two touch electrodes according to still another embodiment of the invention.

FIG. 7 is a partial enlarged schematic diagram of multiple touch patterns of two touch electrodes according to still another embodiment of the invention. Referring to FIG. 7, one bent segment 212a includes a first straight segment 212a-1, a second straight segment 212a-2, a third straight segment 212a-3, and a fourth straight segment 212a-4. One bent segments 222a includes a first straight segment 222a-1, a second straight segment 222a-2, a third straight segment 222a-3 and a fourth straight segment 222a-4. The first straight segment 212a-1, the second straight segment 212a-2, the third straight segment 212a-3, and the fourth straight segment 212a-4 are sequentially connected and arranged along the second direction y. The first straight segment 212a-1 and the second straight segment 212a-2 respectively extends toward different directions. The third straight segment 212a-3 and the fourth straight segment 212a-4 respectively extend toward different directions. Likewise, the first straight segment 222a-1, the second straight segment 222a-2, the third straight segment 222a-3, and the fourth straight segment 222a-4 are sequentially connected and arranged along the second direction y. The second direction y is, for example, a direction away from the line collection region B (shown in FIG. 3). The first straight segment 222a-1 and the second straight segment 222a-2 respectively extends toward different directions. The third straight segment 222a-3 and the fourth straight segment 222a-4 respectively extend toward different directions. In the embodiment of FIG. 7, a length of the first straight segment 212a-1 is smaller than a length of the second straight segment 212a-2, and the first straight segment 222a-1 is smaller than a length of the second straight segment 222a-2. A length of the third straight segment 212a-3 is greater than a length of the fourth straight segment 212a-4, and the third straight segment 222a-3 is greater than a length of the fourth straight segment 222a-4. In another embodiment, the length of the first straight segment 212a-1 can be greater than the length of the second straight segment 212a-2, and the first straight segment 222a-1 can be greater than the length of the second straight segment 222a-2. The length of the third straight segment 212a-3 can be smaller than the length of the fourth straight segment 212a-4, and the third straight segment 222a-3 can be smaller than the length of the fourth straight segment 222a-4 (not shown).

In the aforementioned active area, the touch electrodes 210, the touch electrodes 220 and the pixel regions 100a of the display panel 100 are all periodically arranged and are overlapped to each other, the touch display apparatus 1000 probably have the moiré pattern. In order to reduce the effect of moiré pattern, the first pixel pitch $P_{px}$, the second pixel pitch $P_{py}$, the first touch pitch $P_{tx}$ and the second touch pitch $P_{ty}$ satisfy at least one of the following equations (1) and (2):

$$30\% \leq \frac{|P_{tx} - P_{px}|}{P_{px}} \leq 50\%, \quad \text{equation (1)}$$

$$4 \leq \frac{P_{ty}}{P_{py}} \leq 12. \quad \text{equation (2)}$$

In this way, the spatial frequency of the moiré pattern (for example, a plurality of sawtooth strips) is high, such that the user is uneasy to perceive existence of the moiré pattern, by which a visual effect of the touch display apparatus 1000 is improved.

In another embodiment, when the touch electrodes 210 and the touch electrodes 220 are disposed on the outer surface 120b of the substrate 120 or disposed on the inner surface 120a of the substrate 120, the second pixel pitches $P_{py}$ and the second touch pitches $P_{ty}$ satisfy a following equation (3):

$$3 \leq \frac{P_{ty}}{P_{py}} \leq 7. \quad \text{equation (3)}$$

In this way, the spatial frequency of the moiré pattern is further enhanced, such that the user is not easy to perceive existence of the moiré pattern, so as to further improve the visual effect of the touch display apparatus. Moreover, if the first pixel pitch $P_{px}$, the second pixel pitch $P_{py}$, the first touch pitch $P_{tx}$ and the second touch pitch $P_{ty}$ simultaneously satisfy the equation (1) and the equation (3), the visual effect of the touch display apparatus 1000 is further improved. Further, when the second touch pitch $P_{ty}$ is in the range of 40 μm to 210 μm, and the equation (1) and the equation (3) are both satisfied, the moiré pattern caused by the ambient light and the backlight of the touch display apparatus 1000 can be dramatically reduced.

Referring to FIG. 3, the touch display apparatus 1000 further includes a plurality of peripheral lines 230. The peripheral lines 230 are respectively and electrically connected to the touch electrode 210 and the touch electrode 220. Peripheral lines 230 function as signal lines for carrying driving signals or sensing signals for or from the touch electrodes 210, 220 and at least some of the peripheral lines 230 locate in the aforementioned active area. As shown in FIG. 3, a portion of the peripheral lines 230, the touch patterns 212 of the touch electrode 210, and the touch patterns 222 of the touch electrode 220 are arrange along the first direction x. Each of the peripheral lines 230 is arranged with a line pitch $P_{lx}$ as a repeated interval along the first direction x. Each of the touch patterns 212, 222 is arranged with a first touch pitch $P_{tx}$ as a repeated interval along the first direction x. The line pitch $P_{lx}$ is substantially equal to the first touch pitch $P_{tx}$. A line space S1 exists between any two adjacent peripheral lines 230. The touch internal space Sti exists between any two adjacent touch patterns 212 or the touch patterns 222. A width Wti of the touch internal space Sti in the first direction x is equal to a width Wsl of the line space S1 in the first direction x. In other words, a portion of the peripheral lines 230 having the similar shape and similar arrangement with that of the adjacent touch patterns 212 or the adjacent touch patterns 222 avails the visual effect of the touch display apparatus 1000. That is, at least portion of the peripheral lines 230 having a shape consistent with the shape of adjacent touch patterns 212 or 222.

Referring to FIG. 3, the touch display apparatus 1000 further includes a common electrode 240. The common electrode 240 may be disposed on the outer surface 120a of the substrate 120. Further, the common electrode 240 may partially surrounds the touch electrodes 210, the touch electrodes 220 and the peripheral lines 230 for ESD (Electrostatic Discharge) protection or interposed among the touch electrodes 210, the touch electrodes 220 and the peripheral lines 230 (not shown in FIG. 3) for preventing the electrodes 210, 220 or the peripheral lines 230 from signals cross interference.

The common electrode 240 has a plurality of common patterns 242 for carrying a common signal or a ground signal. A shape of a portion of each of the common patterns 242 is consistent with a shape of a portion of each of the touch patterns 212 or the touch patterns 222. Each of the common patterns 242 is arranged with a common pitch $P_c$ as a repeated interval along the first direction x. The common pitch $P_c$ is substantially equal to the first touch pitch $P_{tx}$. The touch internal space Sti exists between any two adjacent touch patterns 212 or the touch patterns 222. A common internal space Sci exists between any two adjacent common patterns 242. The width Wti of the touch internal space Sti in the first direction x is substantially equal to a width Wsci of the common internal space Sci in the first direction x. A common pitch $P_c$ is equal to a width Wsci plus the width of a common pattern 242. A common external space Sco exists between the common electrode 240 and the adjacent peripheral line 230. The width Wti of the touch internal space Sti in the first direction x is substantially equal to a width Wsco of the common external space Sco in the first direction x. In other words, at least a portion of the common electrode 240, a portion of the peripheral lines 230, a portion of the touch patterns 212 and a portion of the touch patterns 222 have similar shape and similar arrangement. Hence, the visual effect of the touch display apparatus 1000 can be improved.

Figure 8:
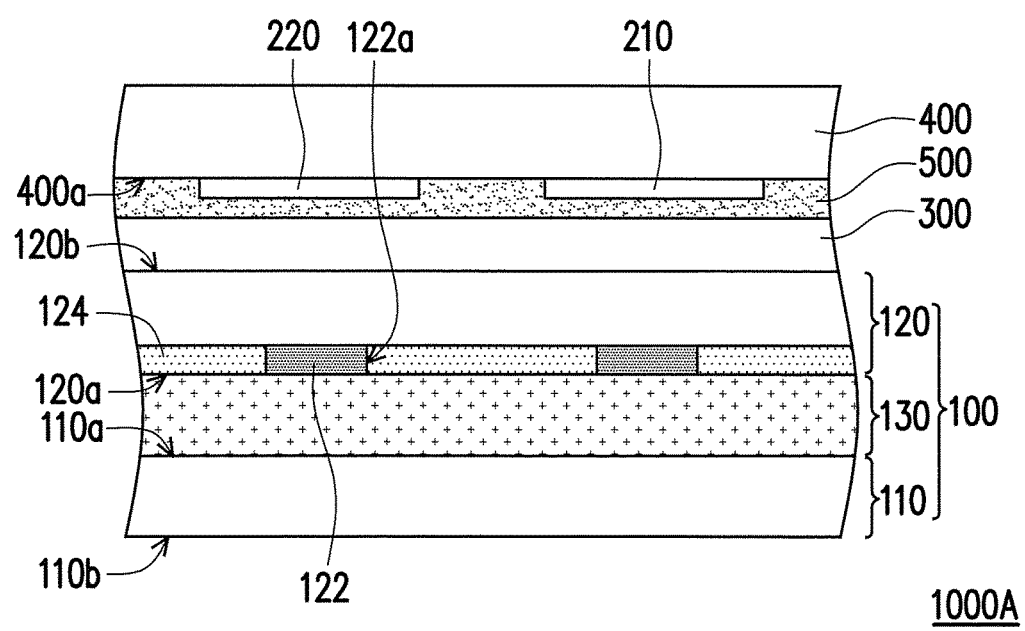
FIG. 8 is a cross-sectional view of a touch display apparatus according to another embodiment of the invention.

FIG. 8 is a cross-sectional view of a touch display apparatus according to another embodiment of the invention. The touch display apparatus 1000A of FIG. 8 is similar to the touch display apparatus 1000 of FIG. 1, and the same or similar components are denoted by the same or similar referential numbers throughout. Referring to FIG. 8, the touch display apparatus 1000A includes the display panel 100 and the touch electrodes 210, 220 are disposed on the display panel 100. A difference between the touch display apparatus 1000A and the touch display apparatus 1000 is that the touch electrodes 210, 220 of the touch display apparatus 1000A are disposed on an inner surface 400a of the protection substrate 400 instead of the outer surface 120b of the substrate 120 of the display panel 100. The protection substrate 400 is regarded as a touch substrate and can be a strengthened glass or a plastic substrate. Description and design rule of the touch electrodes 210, the touch electrodes 220, the first pixel pitch $P_{px}$, the second pixel pitch $P_{py}$, the first touch pitch $P_{tx}$ and the second touch pitch $P_{ty}$ of the touch display apparatus 1000A may refer to the aforementioned description of FIG. 3 and FIG. 4, and detail thereof is not repeated.

In another embodiment, a plurality of pixel regions defined on the array substrate or on the touch substrate, each of the pixel region having a first pixel pitch $P_{px}$ along a first direction and a second pixel pitch $P_{py}$ along a second direction, wherein the first direction and the second direction intersect with each other.

In summary, the touch display apparatus of the invention includes the display panel having a plurality of pixel regions and a plurality of touch electrodes disposed on the display panel. The pixel regions are arranged with first pixel pitches $P_{px}$ along the first direction and with second pixel pitches $P_{py}$ along a second direction. The touch patterns of the touch electrodes are arranged with first touch pitches $P_{tx}$ along the first direction. Each of the touch patterns includes a plurality of bent segments connected to each other. The bent segments are arranged with second touch pitches $P_{ty}$ along the second direction. Particularly, the first pixel pitch $P_{px}$, the second pixel pitch $P_{py}$, the first touch pitch $P_{tx}$ and the second touch pitch $P_{ty}$ satisfy at least one of the following equations:

$$30\% \leq \frac{|P_{tx} - P_{px}|}{P_{px}} \leq 50\%,$$

$$3 \leq \frac{P_{ty}}{P_{py}} \leq 12.$$

In this way, the spatial frequency of the moiré pattern formed by overlapping of the display panel and the touch electrodes is high, such that a user is uneasy to perceive existence of the moiré pattern, by which a visual effect of the touch display apparatus is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A touch display apparatus, comprising:
  a display panel, having a plurality of pixel regions arranged along a first direction and a second direction intersecting the first direction, each of the pixel region having a first pixel pitch $P_{px}$ along the first direction and a second pixel pitch $P_{py}$ along the second direction; and
  a plurality of touch electrodes, disposed on the display panel, each of the touch electrodes having a plurality of touch patterns, each of the touch patterns being arranged with a first touch pitch $P_{tx}$ along the first direction, each of the touch patterns comprising a plurality of bent segments connected to each other, and each of the bent segments being arranged with a second touch pitch $P_{ty}$ along the second direction;
  wherein the first pixel pitch $P_{px}$, the second pixel pitch $P_{py}$, the first touch pitch $P_{tx}$ and the second touch pitch $P_{ty}$ satisfy at least one of the following equations (1) and (2):

$$30\% \leq \frac{|P_{tx} - P_{px}|}{P_{px}} \leq 50\%, \quad \text{equation (1)}$$

-continued $$4 \leq \frac{P_{ty}}{P_{py}} \leq 12. \qquad \text{equation (2)}$$

2. The touch display apparatus as claimed in claim 1, wherein each of the touch patterns has a profile of sawtooth shape.

3. The touch display apparatus as claimed in claim 2, wherein each of the bent segments comprises a first straight segment and a second straight segment connected to each other and respectively extending toward different directions, wherein a length of the first straight segment and a length of the second straight segment are different.

4. The touch display apparatus as claimed in claim 2, wherein each of the bent segments includes a first straight segment, a second straight segment, a third straight segment and a fourth straight segment which are sequentially connected and arranged along the second direction, wherein the first straight segment and the second straight segment extend toward different directions, and a length of the first straight segment is smaller than a length of the second straight segment, wherein the third straight segment and the fourth straight segment extend toward different directions, and a length of the third straight segment is greater than a length of the fourth straight segment.

5. A touch display apparatus, comprising:
a pixel array substrate of a display panel;
a touch substrate opposite to the pixel array substrate;
a plurality of pixel regions defined on the pixel array substrate, each of the pixel region having a first pixel pitch $P_{px}$ along a first direction and a second pixel pitch $P_{py}$ along a second direction intersecting the first direction; and
a plurality of touch electrodes disposed on the touch substrate, each of the touch electrodes having a plurality of touch patterns and a plurality of touch internal spaces alternating with the touch patterns, each of the touch patterns having a plurality of bent segments and each of the bent segments having a second touch pitches $P_{ty}$ along the second direction;
wherein a width of one of the touch patterns and a width of one of the touch internal spaces that are adjacent to each other constitute a first touch pitch $P_{tx}$ along the first direction;
wherein the first pixel pitch $P_{px}$, the second pixel pitch $P_{py}$, the first touch pitch $P_{tx}$ and the second touch pitch $P_{ty}$ satisfy at least one of the following equations (1) and (2):

$$30\% \leq \frac{|P_{tx} - P_{px}|}{P_{px}} \leq 50\%, \qquad \text{equation (1)}$$

$$3 \leq \frac{P_{ty}}{P_{py}} \leq 7. \qquad \text{equation (2)}$$

6. The touch display apparatus as claimed in claim 5, wherein the second touch pitch $P_{ty}$ is in the range of 40μm to 210μm.

7. The touch display apparatus as claimed in claim 5, wherein the display panel comprises two substrates opposite to each other and a display medium disposed between the two substrates, each of the substrates has an outer surface facing away from the display medium, and the touch electrodes are directly disposed on an outer surface of one of the substrates.

8. The touch display apparatus as claimed in claim 5, further comprising:
a protection substrate, disposed on the display panel and having an inner surface facing the display panel, wherein the touch electrodes are disposed on the inner surface of the protection substrate.

9. The touch display apparatus as claimed in claim 5, wherein each of the touch patterns has a profile of sawtooth shape, each of the bent segments comprises a first straight segment and a second straight segment connected to each other and respectively extending toward different directions, wherein a length of the first straight segment and a length of the second straight segment are the same.

10. The touch display apparatus as claimed in claim 9, wherein each of the bent segments has an included angle formed by the second direction and the first straight segment or formed by the second direction and the second straight segment, and the included angle is in the range of 0 degree to 52 degrees.

11. The touch display apparatus as claimed in claim 5, wherein the touch electrodes comprise a first touch electrode and a second touch electrode electrically independent to each other and located adjacent to each other in a coplanar manner, a first touch internal space exists between two adjacent touch patterns of the first touch electrode, a second touch internal space exists between two adjacent touch patterns of the second touch electrode, and a width of the first touch internal space in the first direction is equal to a width of the second touch internal space in the first direction.

12. The touch display apparatus as claimed in claim 11, wherein a touch external space exists between the first touch electrode and the second touch electrode, and a width of the touch external space in the first direction, the width of the first touch internal space in the first direction, and the width of the second touch internal space in the first direction are the same.

13. The touch display apparatus as claimed in claim 5, wherein the touch display apparatus further comprises:
a plurality of peripheral lines, respectively and electrically connected to the touch electrodes, at least a portion of one of the peripheral lines having a shape consistent with that of one of the touch patterns adjacent to the portion of the peripheral line.

14. The touch display apparatus as claimed in claim 5, further comprising:
a plurality of peripheral lines, respectively and electrically connected to the touch electrodes, wherein at least a portion of the peripheral lines are arranged with a plurality of line pitches as repeated intervals along the first direction, and each of the line pitches is equal to the first touch pitch.

15. The touch display apparatus as claimed in claim 5, further comprising:
a plurality of peripheral lines, respectively and electrically connected to the touch electrodes, wherein a touch internal space exits between any two adjacent touch patterns of each of the touch electrodes, a line space exists between any two adjacent peripheral lines, and a width of the touch internal space in the first direction is equal to a width of the line space in the first direction.

16. The touch display apparatus as claimed in claim 5, further comprising:
a common electrode, disposed on the display panel and having a plurality of common patterns, the common patterns and the touch patterns being arranged along the first direction, wherein at least a portion of one of the common patterns has a shape consistent with that of one of the touch patterns adjacent to the portion of the common pattern.

17. The touch display apparatus as claimed in claim 5, further comprising:
a common electrode, disposed on the display panel and having a plurality of common patterns, the common patterns and the touch patterns of the touch electrodes being arranged along the first direction, wherein the common patterns are arranged with a plurality of common pitches as repeated intervals along the first direction, and each of the common pitches is equal to the first touch pitch.

18. The touch display apparatus as claimed in claim 5, further comprising:
a common electrode, disposed on the display panel and having a plurality of common patterns, the common patterns and the touch patterns of the touch electrodes being arranged along the first direction, wherein a touch internal space exists between any two adjacent touch patterns of each of the touch electrodes, a common internal space exists between any two adjacent common patterns, and a width of the touch internal space in the first direction is equal to a width of the common internal space in the first direction.

19. The touch display apparatus as claimed in claim 5, further comprising:
a plurality of peripheral lines, respectively and electrically connected to the touch electrodes; and
a common electrode, disposed on the display panel and having a plurality of common patterns, the common patterns and the touch patterns of the touch electrodes being arranged along the first direction, wherein a touch internal space exists between any two adjacent touch patterns of each of the touch electrodes, a common external space exists between the common electrode and one adjacent peripheral line, and a width of the touch internal space in the first direction is equal to a width of the common external space in the first direction.

20. The touch display apparatus as claimed in claim 5, wherein a touch internal space exists between two adjacent touch patterns of each of the touch electrodes, a width of the touch internal space in the first direction is greater than or equal to 5 μm, and a light transmittance of each of the touch patterns is smaller than or equal to 92%.

21. The touch display apparatus as claimed in claim 5, wherein the touch electrodes are formed in a same thin film layer and are coplanar with each other.

22. The touch display apparatus as claimed in claim 5, wherein a touch sensing method of the touch display apparatus is capacitive sensing.

* * * * *